(12) United States Patent
D'Avello et al.

(10) Patent No.: US 8,175,573 B2
(45) Date of Patent: May 8, 2012

(54) APPARATUS AND METHOD FOR MAINTAINING COMMUNICATIONS WITH A VEHICLE IN THE PRESENCE OF JAMMING

(75) Inventors: Robert F. D'Avello, Lake Zurich, IL (US); James Snider, Kildeer, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 175 days.

(21) Appl. No.: 12/643,850

(22) Filed: Dec. 21, 2009

(65) Prior Publication Data

US 2011/0151795 A1 Jun. 23, 2011

(51) Int. Cl.
*H04M 11/04* (2006.01)
(52) U.S. Cl. ............... 455/404.1; 455/404.2; 455/414.1; 455/67.11; 455/67.13; 455/68; 455/69; 455/556.1; 455/99; 455/456.1; 455/456.3; 340/426.1; 340/426.18; 340/426.19; 340/426.24; 340/426.26
(58) Field of Classification Search .... 455/404.1–404.2, 455/410–411, 414.1–414.2, 521, 527, 67.11, 455/67.13, 68–69, 556.1–556.2, 557, 99, 455/456.1–456.2, 418, 420; 340/902–905, 340/426.1, 426.11–426.19, 426.2–426.29, 340/426.3–426.36
See application file for complete search history.

(56) References Cited

U.S. PATENT DOCUMENTS

| | | | |
|---|---|---|---|
| 5,805,055 A * | 9/1998 | Colizza | 340/426.25 |
| 5,895,436 A | 4/1999 | Savoie et al. | |
| 6,236,337 B1 * | 5/2001 | Beier et al. | 340/905 |
| 6,330,438 B1 | 12/2001 | McClelland et al. | |
| 6,490,513 B1 * | 12/2002 | Fish et al. | 701/35 |
| 6,753,764 B2 * | 6/2004 | Kuo | 340/426.2 |
| 6,803,861 B2 | 10/2004 | Flick | |
| 7,091,835 B2 * | 8/2006 | Boulay et al. | 340/426.19 |
| 7,737,841 B2 * | 6/2010 | Derrick et al. | 340/539.13 |
| 2002/0014978 A1 | 2/2002 | Flick | |
| 2002/0163906 A1 | 11/2002 | Diachina et al. | |
| 2003/0222813 A1 | 12/2003 | Boulay et al. | |
| 2004/0005858 A1 | 1/2004 | Cervinka et al. | |
| 2004/0075539 A1 | 4/2004 | Savoie et al. | |
| 2005/0090952 A1 * | 4/2005 | Boulay et al. | 701/33 |
| 2006/0007039 A1 | 1/2006 | Duvall | |
| 2006/0267744 A1 | 11/2006 | Baumgartner et al. | |
| 2007/0049323 A1 | 3/2007 | Wang et al. | |
| 2007/0079376 A1 | 4/2007 | Jean-Marc et al. | |
| 2007/0200688 A1 | 8/2007 | Tang et al. | |

(Continued)

FOREIGN PATENT DOCUMENTS

DE 10009488 A1 11/2000

(Continued)

OTHER PUBLICATIONS

International Search Report dated Jun. 28, 2011, from corresponding International Patent Application No. PCT/US2010/060795.

(Continued)

*Primary Examiner* — Tuan A Tran

(57) ABSTRACT

Jamming is detected as occurring to communications associated with at least one electronic device disposed at a vehicle. Responsive to detecting the jamming, an indication is transmitted from the vehicle to a base station informing the base station that jamming is occurring. Communications are subsequently conducted between the base station and the vehicle on at least one predetermined and prearranged communication channel.

20 Claims, 2 Drawing Sheets

U.S. PATENT DOCUMENTS

2008/0186932 A1    8/2008  Do et al.

FOREIGN PATENT DOCUMENTS

| | | | |
|---|---|---|---|
| DE | 102004048668 | A1 | 4/2006 |
| EP | 0167442 | A2 | 1/1986 |
| EP | 1362753 | A1 | 11/2003 |
| EP | 1514444 | A1 | 3/2005 |
| EP | 1593564 | A1 | 11/2005 |
| EP | 1809057 | A1 | 7/2007 |
| EP | 2003818 | A1 | 12/2008 |
| EP | 2124428 | A1 | 11/2009 |
| GB | 2296843 | A | 7/1996 |
| GB | 2317418 | A | 3/1998 |
| GB | 2407455 | A | 4/2005 |
| GB | 2435987 | A | 9/2007 |
| GB | 2445046 | A | 6/2008 |
| GB | 2457102 | A | 8/2009 |
| WO | 95/33214 | A1 | 12/1995 |
| WO | 96/04155 | A1 | 2/1996 |
| WO | 00/21053 | A1 | 4/2000 |
| WO | 01/32481 | A1 | 5/2001 |
| WO | WO01/31797 | A1 | 5/2001 |
| WO | 03/103322 | A1 | 12/2003 |
| WO | 2005/112321 | A1 | 11/2005 |
| WO | 2006/092737 | A2 | 9/2006 |
| WO | 2007/019814 | A1 | 2/2007 |
| WO | 2008/111001 | A2 | 9/2008 |

OTHER PUBLICATIONS

International Search Report dated May 24, 2011, from corresponding International Patent Application No. PCT/US2010/060518.
International Search Report dated Jun. 1, 2011, from corresponding International Patent Application No. PCT/US2010/060723.
International Search Report dated Mar. 28, 2011, from corresponding International Patent Application No. PCT/US2010/060803.
International Search Report dated Mar. 10, 2011, from corresponding International Patent Application No. PCT/US2010/060811.
International Search Report dated Apr. 15, 2011, from corresponding International Patent Application No. PCT/US2010/060773.
M. Mouly; M-B Pautet, "Mobility and Security Management" GSM System for Mobile Communications, Jan. 1, 1993, pp. 432-498, Europe Media, Lassay-Les-Chateaux, France.
International Search Report dated Apr. 12, 2011, from corresponding International Patent Application No. PCT/US2010/060760.
International Search Report dated Feb. 28, 2011, from corresponding International Patent Application No. PCT/US2010/060532.
International Search Report dated May 13, 2011, from corresponding International Patent Application No. PCT/US2010/060675.
International Search Report dated Jun. 17, 2011, from corresponding International Patent Application No. PCT/US2010/060787.
International Search Report dated Mar. 1, 2011, from corresponding International Patent Application No. PCT/US2010/060527.
International Search Report dated Mar. 1, 2011, from corresponding International Patent Application No. PCT/US2010/060750.

* cited by examiner

APPARATUS AND METHOD FOR MAINTAINING COMMUNICATIONS WITH A VEHICLE IN THE PRESENCE OF JAMMING

CROSS REFERENCES TO RELATED APPLICATIONS

"Apparatus and Method of Detecting Jamming of Communications" Ser. No. 12/643,049

"Apparatus and Method for Broadcasting the Detection of RF Jammer Presence" Ser. No. 12/643,825

"Apparatus and Method for Compromised Vehicle Tracking" Ser. No. 12/643,498

"Apparatus and Method for Detecting a Cloned Base Station" Ser. No. 12/643,081

"Apparatus and Method for detecting Communication Interference" Ser. No. 12/643,068

"Apparatus and Method for Detecting a Cloned Base Station" Ser. No. 12/643,353

"Apparatus and Method for Determining an Invalid Base Station" Ser. No. 12/643,463

"Apparatus and Method for Determining Vehicle Location" Ser. No. 12/643,412

"Apparatus and Method for Maintaining Communication with a Stolen Vehicle Tracking Device" Ser. No. 12/643,841

"Apparatus and Method for Reducing False Alarms in Stolen Vehicle Tracking" Ser. No. 12/643,889

"Apparatus and Method for Tracking Stolen Vehicles" Ser. No. 12/643,862 all of which are being filed on the same date as the present application and all of which having their contents incorporated herein by reference in their entireties.

FIELD OF THE INVENTION

The field of the invention relates to communications between various entities and, more specifically to detect the jamming or attempted jamming of these communications.

BACKGROUND

Vehicles are equipped with various types of communication systems that provide or facilitate various types of functions. For instance, a vehicle may be equipped with a global positioning satellite (GPS) receiver or system that provides for locating the vehicle and providing information concerning the location of the vehicle to a user. Vehicle security systems are also employed in many vehicles to protect the vehicle and its contents from theft or other criminal activity. For example, a vehicular security system may be configured to communicate with some outside entity (e.g., a police or security center) and when an attempt is made to break into a vehicle, the vehicular security system may transmit messages to the outside entity where appropriate action may be taken to prevent or stop the break in. Some jurisdictions even require the use of security systems in vehicles because of the high number of vehicle break-ins or thefts in these areas.

If a vehicle is stolen, stolen vehicle tracking (SVT) applications attempt to track and sometimes recover the stolen vehicle. To give one example, some SVT applications rely upon a GPS system to pinpoint the location of the vehicle and a Global System for Mobile communications (GSM) cellular network to report the incident to a service provider via Short Message Service (SMS) or General Packet Radio Service (GPRS) data connections.

Potential thieves have sometimes attempted to jam the receiver hardware located at the vehicle by employing devices that create a strong wide-band signal in the receive band and thereby block the GPS satellite from being received at the vehicle and/or to block GSM network signals that are sent from the cellular base station to the vehicle. Previous attempts at maintaining communications with vehicles in the presence of jamming and/or attempted jamming have generally been unsuccessful and/or expensive to accomplish.

Figure 1:
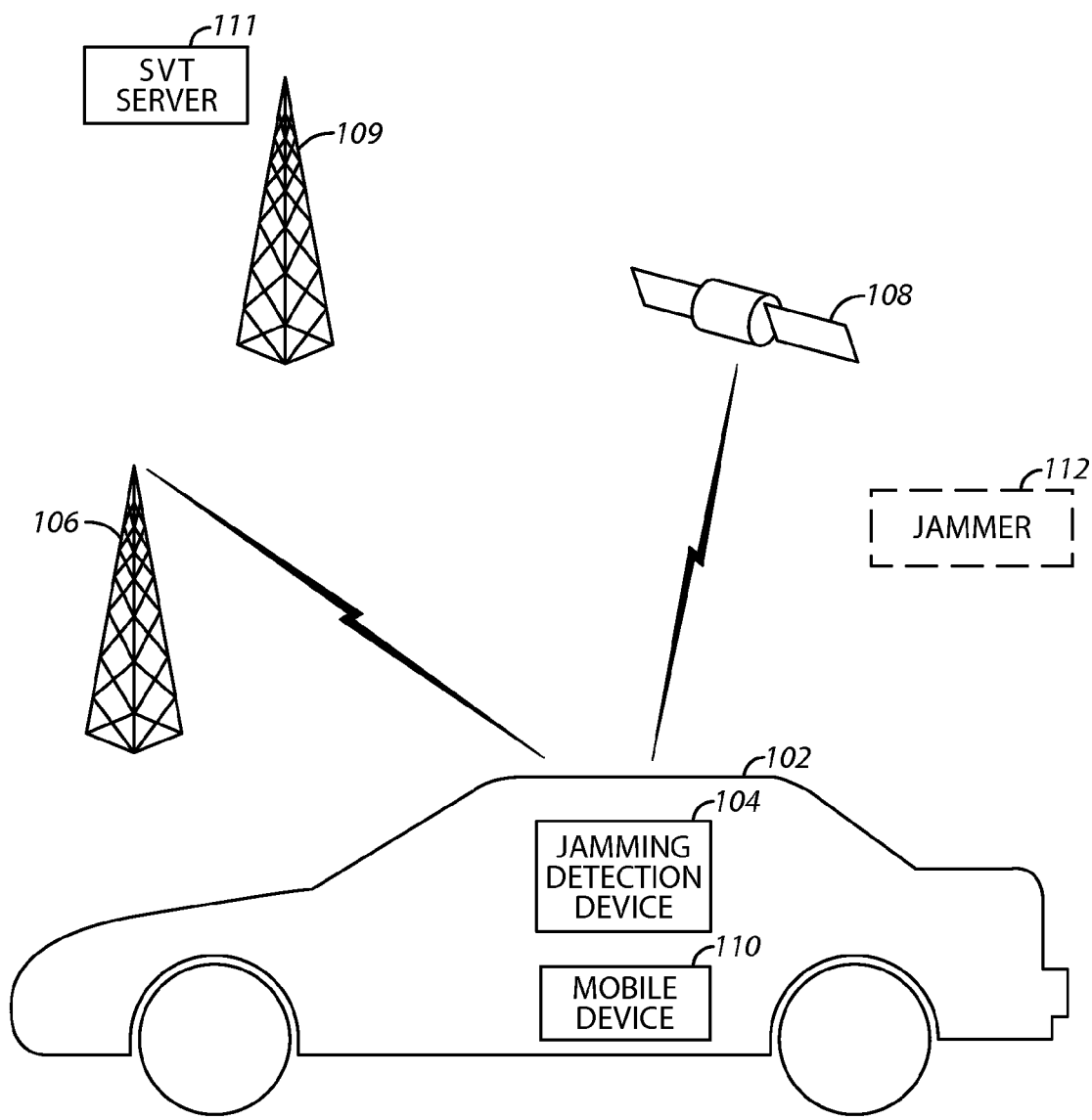
FIG. 1 comprises a block diagram of a system that maintains communications in the presence of jamming between a base station and mobile device at a vehicle according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where communications are maintained as between a vehicle and a stolen vehicle tracking (SVT) system or server (e.g., via at least one base station) in the presence of jamming and/or attempted jamming. The approaches described herein are easy to use, accurate in determining the occurrence of a jamming or attempted jamming, effective in maintaining communications between the base station and the vehicle in the presence of jamming, and cost effective to implement resulting in enhanced security for vehicles and their contents.

In many of these embodiments, jamming of communications associated with at least one electronic device disposed at a vehicle is detected. Responsive to detecting the jamming, an indication is transmitted from the vehicle to a base station informing the base station that jamming is occurring. Communications are subsequently conducted between the base station and the vehicle on at least one predetermined and prearranged communication channel.

In other aspects, the location of the vehicle is tracked. In one approach, the location of the vehicle is determined using triangulation approaches. In another approach, the location of the vehicle is determined using GPS receive location information or in any suitable combination with triangulation. Other location determination approaches including any combinations may also be used to determine the location of the vehicle.

The predetermined and prearranged communication channel may be determined or selected according to a number of different factors. In this respect, it may change as the vehicle moves through a network and/or encounters different types of operating conditions. For example, the channel may be determined based upon the geographical area where the vehicle is operating. To take a particular example, urban areas may utilize one communication channel while rural areas may utilize another communication channel. Other examples are possible.

The pre-selected channel may be any number of channels that operate over a wide variety of frequencies. For example, the channel may operate according to a frequency modulation (FM) frequency approaches, frequency division multiple access (FDMA), direct sequence spreading and/or code division multiple access (CDMA) modulation. In other example, the channel may be a control channel in a cellular communication network. Other examples are possible.

In other aspects, the communications are accomplished using an existing transmitter that normally transmits over an existing communication channel. Once jamming is detected, the transmitter is re-configured to transmit over the predetermined and prearranged communication channel and not the existing communication channel, such as a broadcast control channel (BCCH) or a traffic channel (TCH). In one example, the existing communication channel comprises a Global System for Mobile communications (GSM) channel and the device is re-configured to transmit over a different communication channel (e.g., an FM modulated communication channel or CDMA channel). In another example, a dedicated "backup" or alternate channel may be used (of any frequency or using any modulation approach).

The indication transmitted to the base station may include a wide range of information. For example, the indication includes information such as the last known location of the vehicle, the speed of the vehicle, and the acceleration of the vehicle. Additional information may include, video and audio information and streamed information, identification of the vehicle (registration, VIN, owner contact information), color, make, model and diagnostic and condition information such as battery voltage, the rotation of wheels, engine running, deployment of airbags, vehicle front or rear end elevated, vehicle in gear or in tow. Other examples of information may also be included with the indication. The information included with the indication may be used for other purposes such as vehicle tracking and identification.

In others of these embodiments, an electronic apparatus disposed at a vehicle includes an interface and a controller. The interface is configured with an input and an output and the controller is coupled to the interface. The controller is configured to receive a signal at the input of the interface. The signal indicates that jamming is occurring as to communications at the vehicle (e.g., associated with electronic devices at the vehicle). The controller is further configured to upon receipt of the signal, responsively transmit an indication at the output of the interface to a base station informing the base station that jamming is occurring. According to one embodiment the base station includes a transceiver in a GSM, CDMA, WCDMA, CDMA 2000, UMTS or other system suitable to communicate with a corresponding communication protocol; however the base station may also include a transceiver to communicate any suitable communication protocol in any location such as with a public safety answering point (PSAP), 911 center, E-call center, police station(s) and/or call center. After receiving the indication, the controller is configured to subsequently conduct communications with the base station at the output of the interface on at least one predetermined and prearranged communication channel.

In some examples, the interface includes an existing transmitter and the communications are accomplished using the existing transmitter, which normally transmits over some existing communication channel. The transmitter is re-configured by the controller to transmit including the indications described above over the at least one predetermined and prearranged communication channel and not the existing communication channel. In one example, the existing communication channel comprises a Global System for Mobile communications (GSM) channel. In some examples, the re-configured channel is a channel that is out-of-band as to channels the transmitter would normally transmit communications. For example, if the device normal transmits over GSM frequencies, then it could be re-configured to transmit over non-GSM frequencies (e.g., FM modulated frequencies). The transmission of communications including the indications described above at out-of-band frequencies may make it especially difficult for a criminal to successfully jam the communications between the base station and the vehicle.

Referring now to FIG. 1, one example of a system for maintaining communications with a vehicle in the presence of jamming is described. A vehicle 102 includes a communication and jamming detection device 104 and a mobile device 110. The communication and jamming detection device 104 is disposed anywhere in or at the vehicle 102 and communicates with a base station 106 and an external navigation system 108.

The mobile device 110 is also disposed in the vehicle and may be any type of mobile wireless communication unit. For example, the mobile device 110 may be a cellular phone, a pager, a personal digital assistant, or a personal computer to mention a few examples. Other examples of mobile devices are possible. The approaches described herein allow the device 104 to maintain communication with a SVT server 111. This can be accomplished by re-configuring the device 104 to communicate on a communication channel it would not normally use, use a dedicated channel in the band it is currently using (e.g., within the GSM band), using an out-of-band channel (e.g., FM modulated channel), or some combination of these approaches.

The communication and jamming detection device 104 may be, in one example, a programmed electronic device that determines the location of the vehicle 102 from signals received from the navigation system 108 and determines if jamming and/or attempted jamming is occurring as to signals being received and/or being transmitted at the vehicle. Alternatively, another separate device may be used to determine the location of the vehicle and this separate device may communicate with the communication and jamming detection device 104. By way of example, jamming detection may include a certain number of attempts to request communications, such as on a random access channel (RACH) resulting in no response or an insufficient response, or a time out due to not receiving an appropriate response within a period of time. Additional jamming detection techniques are described in the co-pending applications referenced above. The external navigation system 108 may be a GPS satellite or satellite system, in one example.

Jamming (or attempted jamming) is determined with respect to any of the signals transmitted and/or received from the mobile device 110, the communication and jamming detection device 104, the navigation system 108, and/or any other electronic device at the vehicle 102 that is configured to transmit and/or receive communications. The detection of jamming as to any of these signals causes an indication to be sent to the base station 106 alerting the base station 106 of the occurrence of the jamming. The indication may be sent via the communication and jamming detection device 104 or the mobile device 110. Once this indication signal is received, the base station 106 and the mobile device 110 (and/or the communication and jamming detection unit 104) tune to the same predetermined channel that is known to all of these units. In this manner, even if the mobile device 110 cannot receive signals from the base station 106 due to a jammer 112 the mobile device 110 may at transmit the indication information described above to inform the base station 106 that the vehicle 102 is being jammed or possibly stolen. As a result, the mobile device 110 may send information indicating jamming to the base station 106, even if the mobile device 110 cannot communicate normally according to the communication protocol. For example, the mobile device 110 may inform base station 106 that vehicle 102 is being jammed or possibly stolen even in the event full duplex communication is not possible in a system normally requiring full duplex communication. In another example, another base station 109 is used to reach the SVT server 111. For example, the base station 109 may be an iDEN base station that is used for alternative (backup) communication).

The predetermined channel may be a control channel (or any other channel) and its identity may be stored at a memory location at one of the devices at the vehicle and at another memory location at the base station. The identity may be stored at a time when the system is initially configured, when the device is manufactured, or at any other suitable time. As also described herein, the device that transmits at the new channel may be re-configured to transmit at the new channel where the new channel is out-of-band to the channel at which the device normally transmits. For example, one or more channels or frequencies (i.e. SVT channels) may be reserved in a frequency plan for a mobile communication system to be allocated as the predetermined channel.

Jamming can be determined in a variety of different ways. In some examples, as described in co-pending application Ser. No. 12/643,049 entitled "Apparatus and Method for Detecting Jamming of Communications" filed on the same date as the present application and having, a signal strength indicator is a numeric value that generally indicates the strength of a received signal in cellular communication systems. More specifically, the signal strength indicator is a value that indicates the magnitude of the signals that are transmitted and received within these systems.

A first rate of rise of a signal strength indicator associated with the first communication channel and a second rate of rise of a signal quality indicator associated with the first communication channel are monitored. The signal strength indicator may be a received signal strength indicator (e.g., Rx Level) and the signal quality indicators may be the RX quality level (Rx Qual). When at least one of the first rate rises at a rate greater than a first predetermined threshold rate and the second rate rises at a rate greater than a second predetermined threshold rate, jamming can be determined to exist.

Any number of antennas may be used by the communication device 104 or the mobile device 110. In one example two antennas are used and one antenna is used to transmit signals and the other is used to receive signals. In other examples, multiple TX and RX antennas can be used with some of the antennas being used as backup antennas. If the path loss abruptly changes, then the device can switch antennas. In one aspect, when jamming is occurring (or detected to be occurring) then the device can switch antennas and attempt to communicate on the backup antenna or backup antennas. In still other examples, a single antenna is used.

Many of the approaches described herein are described as being executed by devices that are at least partially disposed at or within a vehicle. However, it will be appreciated that the approaches described herein are not limited to devices that can be disposed at or within vehicles, but can be used with devices that are disposed at any location such as within homes, businesses, mobile communication devices, or even with individuals that are not within or associated with a vehicle.

The vehicle 102 may be any type of vehicle such as a car, truck, bus, airplane, ship, to name a few examples. The communication device 104 is any type of communication device that communicates with entities outside the vehicle 102 using any type of communication technology or protocol. For example, the communication device 104 may be or may incorporate a cellular phone, telemetric control unit (TCU) transponder, radio, or some combination of these or other devices.

As mentioned, various control channels can be pre-selected and used for communications once jamming is detected. Control channels may be used by idle mode mobile units to exchange signaling information, and changing to dedicated mode may be required. Mobiles in dedicated mode monitor the surrounding base stations for handover and other information.

Some examples of control channels that can be used include: Broadcast Control Channels (BCCHs) that provide base station identification, broadcasts, and frequency allocations; Frequency Correction Channels (FCCHs) and Synchronization Channel (SCHs) that are used for synchronization, and physical layer definition (time slots, burst time and so forth); Random Access Channels (RACHs) that are used by mobile to request access to the network; Paging Channels (PCHs) used for locating the mobile user; and Access Grant Channels (AGCHs) that are used to obtain a dedicated channel (e.g., following the request of RACH). Other examples are possible.

In one example of the operation of the system of FIG. 1, a jammer transmitting near a vehicle transceiver results in a receiver/transmitter at the vehicle (e.g., a receiver/transmitter at one of the devices 104 or 110) being unable to receive communication from a base station 106 and/or the navigation system 108 and the approaches described herein overcome this problem. More specifically, when the device 104 at the vehicle 102 detects signals at the vehicle are being jammed, some device at the vehicle (e.g., the device 104 or mobile device 110) may transmit on the RACH (or any access channel, i.e. CDMA) an indication to the last known base station 106 that jamming is occurring.

Upon receipt of the RACH indication (that mobile jamming is occurring) at the base station 106, both the base station 106 and mobile device 110 can enter emergency or stolen vehicle tracking (SVT) mode where the base station 106 and the mobile device 110 tune to a predetermined SVT traffic (TCH) and radio channel. Alternatively, the base station 106 and the mobile station 110 transmit on an out-of-band frequency channel (e.g., to the alternative base station 109). According to another embodiment, the mobile device 110 may transmit the indication of jamming on a predetermine traffic channel, such as a SVT TCH without first transmitting the jamming indication on the RACH, if for example, one or more base station(s) 106 monitors the SVT TCH. One base station could be configured to conduct/receive communications or multiple base stations could receive communications and could triangulate these SVT transmissions and even include messages. The message could include vehicle location, or last know location (if GPS is jammed) of the vehicle and, if there is an accelerometer at the vehicle, the vehicle speed, and vehicle direction. Additionally, information indicating if engine is on could be included so as to assist police to locate vehicle.

Further, a system operator, over a wide geographic area (e.g., over a state, region, or country) could adopt these features in a standardized approach. An operator could implement these approaches at every mobile station/device and base station by enabling this function based on the subscriber identifier (SID) of the mobile station/device and base station. Outside of these SIDs/systems, the mobile station/device can function normally according to various standards. Optionally, mobile units could implement authentication to improved security and reliability and to avoid decoy SVT mobile stations/devices by an unregistered mobile station/device being jammed.

The communication network can be various types of networks. For example, the communication network comprises a cellular network. In one example, the cellular network is a Global System for Mobile communications (GSM) cellular network. Other examples of networks are possible.

In another example of the operation of the system of FIG. 1, jamming is detected as occurring as to communications associated with at least one electronic device disposed at the vehicle 102. Responsive to detecting the jamming, an indication is transmitted from the vehicle 102 to the base station 106 informing the base station 106 that jamming is occurring. Communications are subsequently conducted between the base station 106 and the vehicle 102 (i.e., at least one electronic device at the vehicle 102) on at least one predetermined and prearranged communication channel.

In other aspects, the location of the vehicle 102 is tracked. The location of the vehicle 102 may be determined using triangulation approaches. Alternatively, the mobile device 110 may transmit once, intermittently or continuously the vehicle location in response to GPS receiver information. Other location determination approaches may also be used.

The predetermined and prearranged communication channel may be determined and selected according to a number of different factors. For example, the channel may be determined based upon the geographical area where the vehicle 102 is operating. Other examples of selection approaches and criteria can also be used.

The channel may be any number of channels that operate according to a wide variety of frequencies. For example, the channel may operate over a frequency modulation (FM) frequency. Other examples of channel and channel types are possible and may be pre-selected.

In other aspects, the communications are accomplished using an existing transmitter that transmits normally over an existing communication channel. The transmitter is re-configured to transmit over the at least one predetermined and prearranged communication channel and not the existing communication channel. In one example, the existing communication channel comprises a Global System for Mobile communications (GSM) channel and the new channel is an FM modulated channel. Other examples and combinations are possible.

The indication transmitted to the base station 106 may include a wide range of information. For example, the indication includes information such as the last known location of the vehicle 102, the speed of the vehicle 102, the direction of the vehicle 102 and the acceleration of the vehicle 102. Other examples of information are possible.

In another aspect, once jamming is detected various actions can be taken that affect the operation of the vehicle and/or a driver's ability to successfully drive the vehicle 102. In these examples, it is assumed that the detection of jamming denotes an attempt by a criminal to steal the vehicle 102 and/or its contents. Consequently, these approaches attempt to stop the theft of the vehicle 102 and/or its contents by adversely affecting the operation of the vehicle so that the criminal has a difficult or impossible time operating the vehicle 102. For example, the radio operation can be changed (e.g., by setting its sound level to a deafening level), the operation of the lights of the vehicle can be adjusted (e.g., by deactivating the lights at night), the operation of the horn can be altered (e.g., by activating the horn), the operation of the stability control system can be altered (e.g., to cause unstable operation), the seat location can be adjusted (e.g., by moving the seat to an uncomfortable position), the operation of heat controlled seats can be changed (e.g., by setting a temperature that is uncomfortable or scalding to a driver), the steering wheel operation can be altered (e.g., by locking the steering wheel), the temperature of the vehicle interior can be changed (e.g., by setting the temperature to an uncomfortable hot or cold setting), and/or the tone of an audible device can be altered (e.g., to produce a deafening tone) based upon the detection of jamming to thereby make theft of the vehicle and/or its contents difficult or impossible for the thief to achieve.

Figure 2:
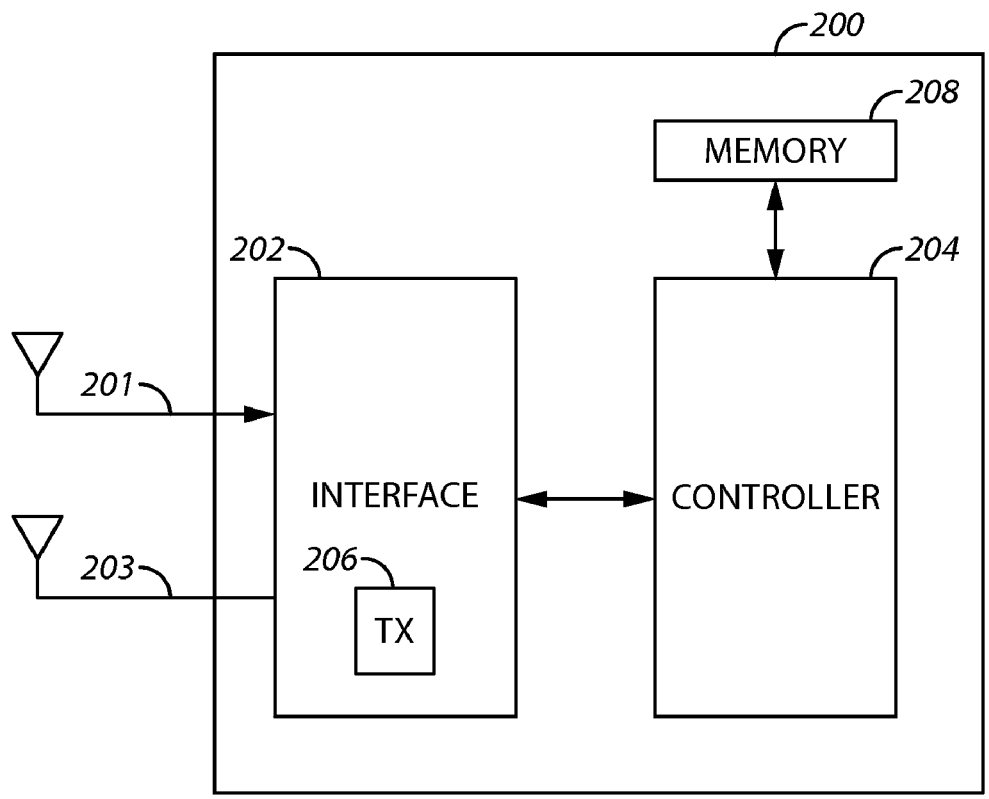
FIG. 2 comprises a block diagram of an apparatus that maintains communications in the presence of jamming between a base station and mobile device at a vehicle according to various embodiments of the present invention.

Referring now to FIG. 2, one example of an apparatus 200 disposed in a vehicle includes an interface 202 and a controller 204. Apparatus 200 may be part of an SVT device, a telematics unit, a vehicle head unit, a vehicle communications systems including any suitable single and duplex systems. The interface 202 is configured with an input 201 and an output 203 and the controller 204 is coupled to the interface 202. A memory 208 stores the identity of a predetermined and prearranged communication channel. Memory 208 according to one embodiment contains instructions executable by one or more controllers (or processors) 204 to execute or perform the operations, methods and techniques described. Memory 208 may represent any device suitable for storing, retrieving, transmitting or communicating instructions including the Internet, file transfer protocol (FTP) dynamic memory, hard drive, flash memory, and documents including paper and electronic documents.

The controller 204 is configured to receive a signal at the input 201 of the interface 202. The signal indicates that jamming is occurring as to communications at the vehicle. The controller 204 is further configured to, responsive to the signal, transmit an indication at the output 203 of the interface 202 to a base station informing the base station that jamming is occurring. The controller 204 is configured to subsequently conduct communications with the base station at the output 203 of the interface 202 on at least one predetermined and prearranged communication channel.

In some examples, the interface 202 includes an existing transmitter 206 and the communications are accomplished using the existing transmitter 206 that transmits normally over an existing communication channel. The transmitter 206 is re-configured by the controller to transmit over the at least one predetermined and prearranged communication channel and not the existing communication channel. The transmitter 206 may be reconfigured by, for instance, by altering the operation of electronic components at the transmitter (e.g., adjusting the values/operation of electronics of components such as capacitors, resistors or the like that in turn changes the frequency of the transmitter 206). Such approaches of adjusting transmitter operation/frequencies are well known to those skilled in the art and will not be described in greater detail here.

In one example, the existing communication channel comprises a Global System for Mobile communications (GSM) channel. In one approach, the re-configured channel is an FM modulated channel. Other examples and combinations of channels and/or channel types are possible.

It will be appreciated that the device 200 may perform other functions besides the functions described above. For example, if the device is a cellular phone, the controller 204/interface 202 may implement and provide all functions associated with a cellular phone (e.g., transmission and reception of calls). It will also be appreciated that the device 200 in some examples may itself detect that jamming is occurring.

Figure 3:
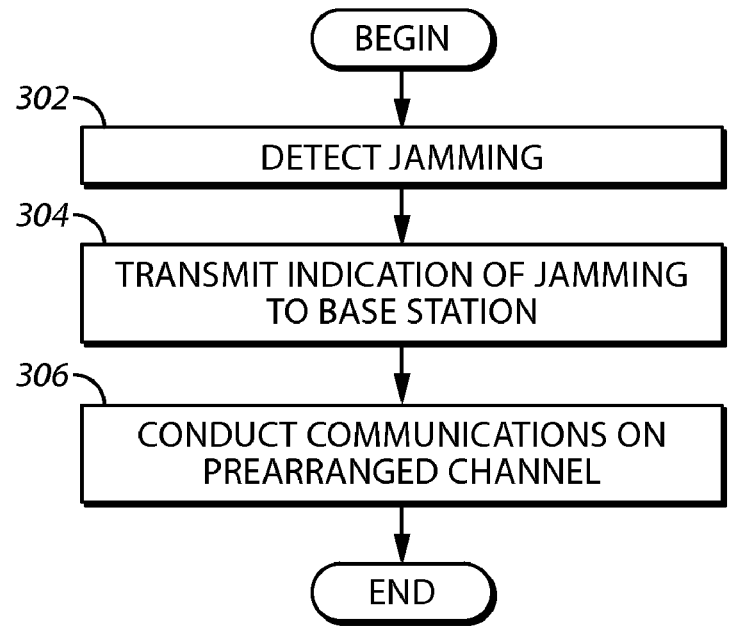
FIG. 3 comprises a flowchart of one example of an approach for maintaining communications in the presence of jamming between a base station and mobile device at a vehicle according to various embodiments of the present invention.

Referring now to FIG. 3, one example of an approach for maintaining communications between a vehicle and a SVT server is described. At step 302, jamming is detected as occurring to communications associated with at least one electronic device disposed at a vehicle. As mentioned, jamming can be determined in a variety of different ways such as determining the rate of rise on a signal strength indicator. When at least one of the first rate rises at a rate greater than a first predetermined threshold rate and the second rate rises at a rate greater than a second predetermined threshold rate, jamming can be determined to exist. Other approaches may also be used to determine that jamming exists.

At step 304, responsive to detecting the jamming, an indication is transmitted from the vehicle to a base station informing the base station that jamming is occurring. The indication transmitted to the base station may include a wide range of information. For example, the indication includes information such as a last known location of the vehicle, a speed of the vehicle, an acceleration of the vehicle. Other examples of information may also be included with the indication.

At step 306, communications are subsequently conducted between the base station and the vehicle on at least one predetermined and prearranged communication channel. In this respect, transmitters and/or receivers at both the base station and at the vehicle are tuned to the new channel. As mentioned, this may be accomplished by adjusting the operation of various electronic components of these devices to transmit/receive at the new channel. Also as mentioned, the identity of the new channel is stored at both the base station and all electronic devices at the vehicle. In another example, this information may be stored at a controller at the end of the land link. If an alternate communication system is used, the information may be stored somewhere on the alternate communication system. In some examples, all electronic devices are programmed with the identity of the new channel at manufacturing or at some other convenient time (e.g., when the device is activated). In other examples, a customer may have to pay a subscription/user fee for this service and the identity of the channel may be programmed at the time the fee is paid/service is activated.

In one example, the communications are accomplished using an existing transmitter that transmits normally over an existing communication channel. The transmitter is re-configured to transmit over the at least one predetermined and prearranged communication channel and not the existing communication channel. In one example, the existing communication channel comprises a Global System for Mobile communications (GSM) channel. In this way, communications are maintained between the vehicle and the SVT system or server.

Thus, approaches are provided where after jamming communications are maintained as between a vehicle and a SVT system (e.g., via at least one base station). The approaches described herein are easy to use, accurate in determining the occurrence of a jamming or attempted jamming, effective in maintaining communications between the base station and the vehicle in the presence of jamming, and cost effective to implement resulting in enhanced security for vehicles and their contents.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of maintaining communications with a vehicle in the presence of jamming, the method comprising:
at the vehicle: detecting that jamming of communications associated with at least one electronic device disposed at a vehicle is occurring;
responsive to detecting the jamming, transmitting an indication from the vehicle to a dynamically tuned base station informing the base station that jamming is occurring;
upon receipt of the indication at the base station, subsequently conducting communications between a stolen vehicle tracking (SVT) server and the vehicle on at least one predetermined and prearranged communication channel, the SVT server being in communication with the base station, the channel being established between the base station and the vehicle without the use of an intervening mobile wireless device, wherein at least one transmitter at the vehicle is dynamically tuned to the same channel as the dynamically tuned base station.

2. The method of claim 1 further comprising tracking the location of the vehicle.

3. The method of claim 2 wherein tracking the location of the vehicle comprises tracking the location of the vehicle using at least one of: triangulation approaches and GPS receiver location information.

4. The method of claim 1 wherein the at least one predetermined and prearranged communication channel is determined at least in part based upon the geographical area where the vehicle is operating.

5. The method of claim 1 wherein the at least one predetermined and prearranged communication channel comprises at least one of: a frequency modulation (FM) frequency direct sequence spreading and code division multiple access (CDMA) modulation.

6. The method of claim 1 wherein the communications are accomplished using an existing transmitter that transmits normally over an existing communication channel, the transmitter being re-configured to transmit over the at least one predetermined and prearranged communication channel and not the existing communication channel.

7. The method of claim 6 wherein the existing communication channel is selected from the group consisting of: a Global System for Mobile communications (GSM) channel, an out-of-band GSM channel, a code division multiple access (CDMA) channel and an out-of-band CDMA channel.

8. The method of claim 1 wherein the indication comprises information selected from the group consisting of: a last known location of the vehicle, a speed of the vehicle, an acceleration of the vehicle.

9. The method of claim 1 wherein the communications are conducted over an alternative base station.

10. An electronic apparatus disposed in a vehicle, comprising:
- an interface with an input and an output;
- a controller coupled to the interface, the controller being configured to receive a signal at the input of the interface, the signal indicating that jamming of communications at the vehicle is occurring, the controller further configured to responsive to the signal, transmit an indication at the output of the interface to a dynamically tuned base station informing the base station that jamming is occurring, the controller configured to upon receipt of the indication at the base station, subsequently conduct communications with a stolen vehicle tracking (SVT) server at the output of the interface on at least one predetermined and prearranged communication channel, the SVT server being in communication with the base station, the channel being established between the base station and the vehicle without the use of an intervening mobile wireless device, wherein at least one transmitter at the vehicle is dynamically tuned to the same channel as the dynamically tuned base station.

11. The apparatus of claim 10 wherein the at least one predetermined and prearranged communication channel is determined at least in part based upon the geographical area where the vehicle is operating.

12. The apparatus of claim 10 wherein the at least one predetermined and prearranged communication channel comprises at least one of: a frequency modulation (FM) frequency, direct sequence spreading and code division multiple access (CDMA) modulation.

13. The apparatus of claim 10 wherein the interface comprises an existing transmitter and the communications are accomplished using the existing transmitter that transmits normally over an existing communication channel, the transmitter being re-configured by the controller to transmit over the at least one predetermined and prearranged communication channel and not the existing communication channel.

14. The apparatus of claim 13 wherein the existing communication channel comprises a Global System for Mobile communications (GSM) channel.

15. The apparatus of claim 10 wherein the indication comprises information selected from the group consisting of: a last known location of the vehicle, a speed of the vehicle, an acceleration of the vehicle.

16. The apparatus of claim 10 wherein the electronic apparatus is disposed at a location selected from the group consisting of: within a vehicle, within a vehicle communication systems, within a stolen vehicle tracking device, within an integrated vehicular mobile communications device, and within a vehicle telematics unit.

17. Memory comprising instructions executable by one or more processors to:
- at the vehicle: detect that jamming of communications associated with at least one electronic device disposed at a vehicle is occurring;
- responsive to detecting the jamming, transmit an indication from the vehicle to a dynamically tuned base station informing the base station that jamming is occurring;
- upon receipt of the indication at the base station, subsequently conduct communications between a stolen vehicle tracking (SVT) server and the vehicle on at least one predetermined and prearranged communication channel, the SVT server being in communication with the base station, the channel being established between the base station and the vehicle without the use of an intervening mobile wireless device, wherein at least one transmitter at the vehicle is dynamically tuned to the same channel as the dynamically tuned base station.

18. The memory of claim 17 further comprising further instructions executable by one or more processors to track the location of the vehicle using at least one of:
- triangulation approaches, and GPS receiver location information.

19. The memory of claim 17 wherein the at least one predetermined and prearranged communication channel comprises at least one of: a frequency modulation (FM) frequency, direct sequence spreading and code division multiple access (CDMA) modulation.

20. The memory of claim 17 wherein the communications are accomplished using an existing transmitter that transmits normally over an existing communication channel, the transmitter being re-configured to transmit over the at least one predetermined and prearranged communication channel and not the existing communication channel.

* * * * *